United States Patent [19]
Fukuma et al.

[11] 3,898,440
[45] Aug. 5, 1975

[54] SIZE CONTROL APPARATUS FOR MACHINE TOOL

[75] Inventors: Nobuo Fukuma, Toyota; Hideyuki Matsubara, Toyoake; Yoshinobu Inuma, Toyota; Tadahiro Takasu, Nishio; Takao Yoneda, Kariya, all of Japan

[73] Assignees: Toyoda-Koki Kabushiki-Kaisha; Toyota Jidosha Kogyo Kabushiki Kaisha, both of Japan

[22] Filed: Sept. 6, 1974

[21] Appl. No.: 503,620

[30] Foreign Application Priority Data
Sept. 8, 1973  Japan.............................. 48-101440

[52] U.S. Cl. ...... 235/151.13; 51/165.91; 51/165.71
[51] Int. Cl....................... B24b 49/02; B23q 15/00
[58] Field of Search............. 235/151.13; 51/165.71, 51/165.88, 165.91

[56] References Cited
OTHER PUBLICATIONS
"Role of Statistical Computation in Machine-Tool Feedback Gaging," by David N. Smith, Control Engineering, Sept., 1957, pp. 190–196.

*Primary Examiner*—Eugene G. Botz
*Attorney, Agent, or Firm*—Oblon, Fisher, Spivak, McClelland & Maier

[57] ABSTRACT

A size control apparatus for a machine tool having an in-process gauge device, a post-process gauge device, a calculating device and a compensating device. The post-process gauge device measures the workpiece machined under the supervision of the in-process gauge device and supplies the measured value to the calculating device. The calculating device derives an estimated value for a workpiece to be next machined from a predetermined number of measured values and ascertains a compensating value when the estimated value exceeds a control limit. The compensating device, when given the compensating value, shifts a null-point of the in-process gauge device so that the finish size of the workpiece may be compensated.

19 Claims, 7 Drawing Figures

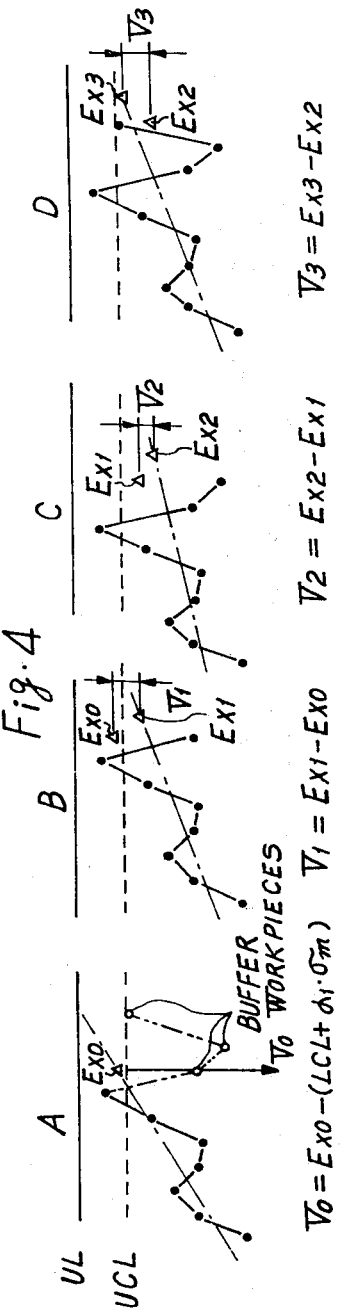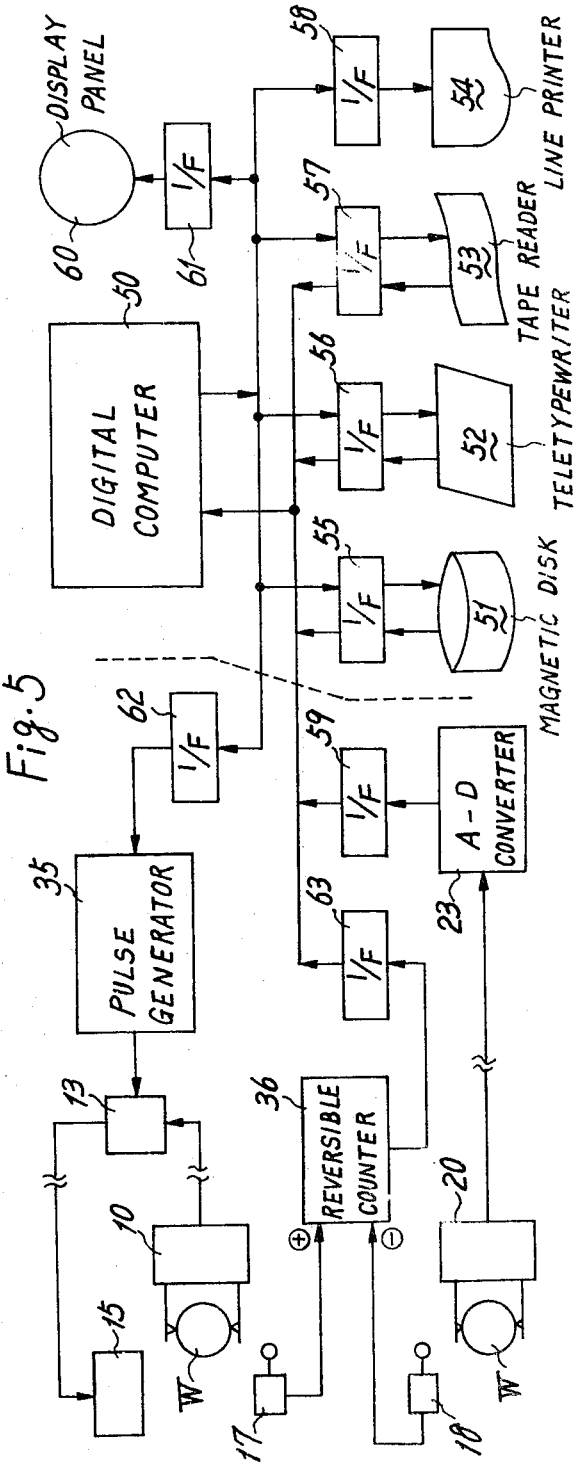

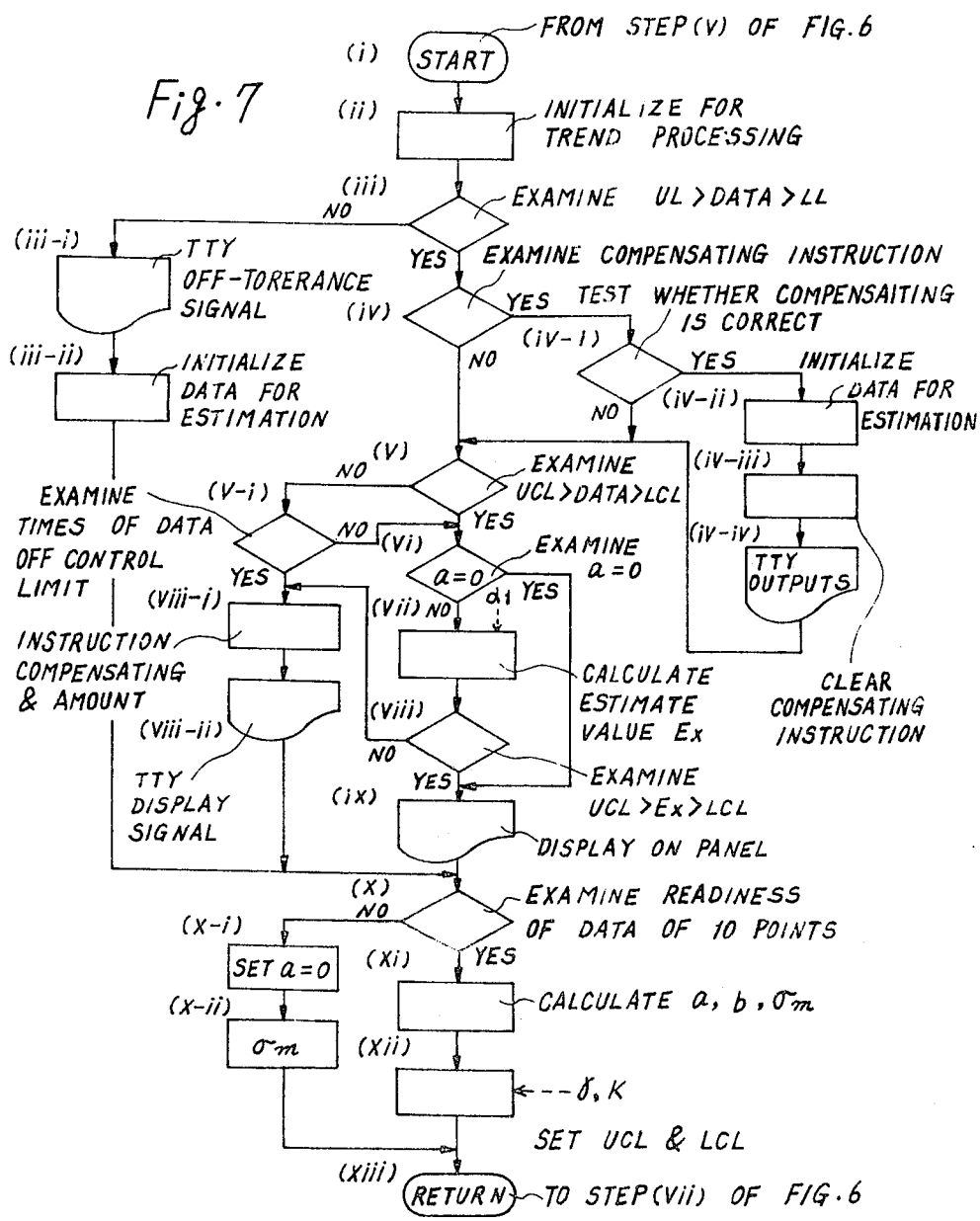

SIZE CONTROL APPARATUS FOR MACHINE TOOL

BACKGROUND OF THE INVENTION

1. Field of the Invention

The present invention relates generally to a size control apparatus for a machine tool and more particularly, to an improved and novel automatic null-point compensating apparatus for an in-process gauge wherein it may be automatically operated to adjust or compensate a null-point of the inprocess gauge based upon the measurement results from post-process gauge.

2. Description of the Prior Art

Heretofore, it has been known to feed back the measurement signal from a post-process gauge which measures the size of a workpiece already machined into an in-process gauge which controls the size of a workpiece being machined and thereby, to compensate a null-point or an operating point of the in-process gauge. When the feedback signal is supplied to the in-process gauge, it is able to compensate for the drift of the gauge per se and furthermore, to decrease size error of the finished workpiece which occurs depending upon whether the coolant is elevated in temperature.

However, if the compensation of the null-point is dependent upon one measurement signal which is obtained each time a workpiece is measured by means of the post-process gauge, the frequency of compensating the null-point is not only extremely high, but the chance of a measurement error becomes large and is dependent upon the reliability of the post-process gauge. In addition, if several workpieces (buffer workpieces) exist between a work station for the machining of the workpiece and a measuring station for the measuring of the completed workpiece, compensation signals may be successively generated from each workpiece with the result that there is brought about a hunting with respect to the size control system as a result of excessive compensation times.

SUMMARY OF THE INVENTION

It is therefore an object of the present invention to provide a new and improved size control apparatus for a machine tool which avoids the defects of the prior art apparatus wherein a null-point compensation is performed depending upon only one measurement signal obtained from one workpiece.

Another object of the present invention is to provide a new and improved size control apparatus for a machine tool which is applicable when there are several buffer workpieces between a work station provided with an in-process gauge and a measuring station provided with a post-process gauge.

A further object of the present invention is to provide a new and improved size control apparatus for a machine tool which can decrease an error of a compensation value where the error is due to the inaccuracy of a post-process gauge in measuring the workpiece size.

The foregoing and other attendant objects are attained according to the present invention through the provision of a size control apparatus for a machine tool which comprises an in-process gauge for sizing the workpiece under machining operation, a post-process gauge for sizing the machined workpiece and a calculating means for applying a compensating signal to the in-process gauge based upon measurement signals from the post-process gauge. The calculating means calculates a trend in a predetermined number of measured values from the post-process gauge in the form of a time sequence over a period covering the past, present and future and thereafter obtains an estimated value for the next workpiece to be machined. The calculating means furthermore judges whether a compensation for a null-point is necessary or not, according to the estimated value and thereby, obtains an optimum compensating value.

Accordingly, a compensating error depending upon an inaccurate measurement by the post-process gauge may be obviated. Moreover, the largest compensating amount within lower and upper control limits can be obtained. The workpieces that deviate from the control limits are quite small in number since the null-point is compensated by the largest compensating amount. Therefore, the quality of the workpiece size may be stabilized.

In addition, a size control apparatus according to the present invention further includes a detecting means for detecting the number of buffer workpieces which exist between the in-process and post-process gauges. In this case, the calculating means carries out a compensation with a total compensating amount optimized to the estimated value in an initial compensation for a null-point. As regards the compensations for successive buffer workpieces, the calculating means obtains a compensating amount which is the difference between newly and previously estimated values as to each buffer workpiece and the compensation is repeatedly performed to correspond to the number of the buffer workpieces.

Therefore, as the difference between the estimated values is utilized as the compensating amount, a null-point compensation with an excessive compensating amount may be prevented, and it is therefore possible to correctly reflect the actual measured values of the buffer workpieces by the in-process gauge. Consequently, the reliability of the sizing control operation in a machining system can be elevated.

BRIEF DESCRIPTION OF THE DRAWINGS

Various other objects, features and attendant advantages of the present invention will be more fully appreciated as the same become better understood from the following detailed description when considered in connection with the accompanying drawings, in which like reference numerals designate like or corresponding parts throughout the several views and wherein:

FIG. 4 shows the relationship between estimate values and compensating amounts where buffer workpieces exist;

FIG. 5 is a block diagram showing another apparatus of the invention utilized in place of that in FIG. 1; and FIGS. 6, 7 are flow charts of a processing routine used in connection with the apparatus in FIG. 5.

DETAILED DESCRIPTION OF THE PREFERRED EMBODIMENTS

Figure 1:
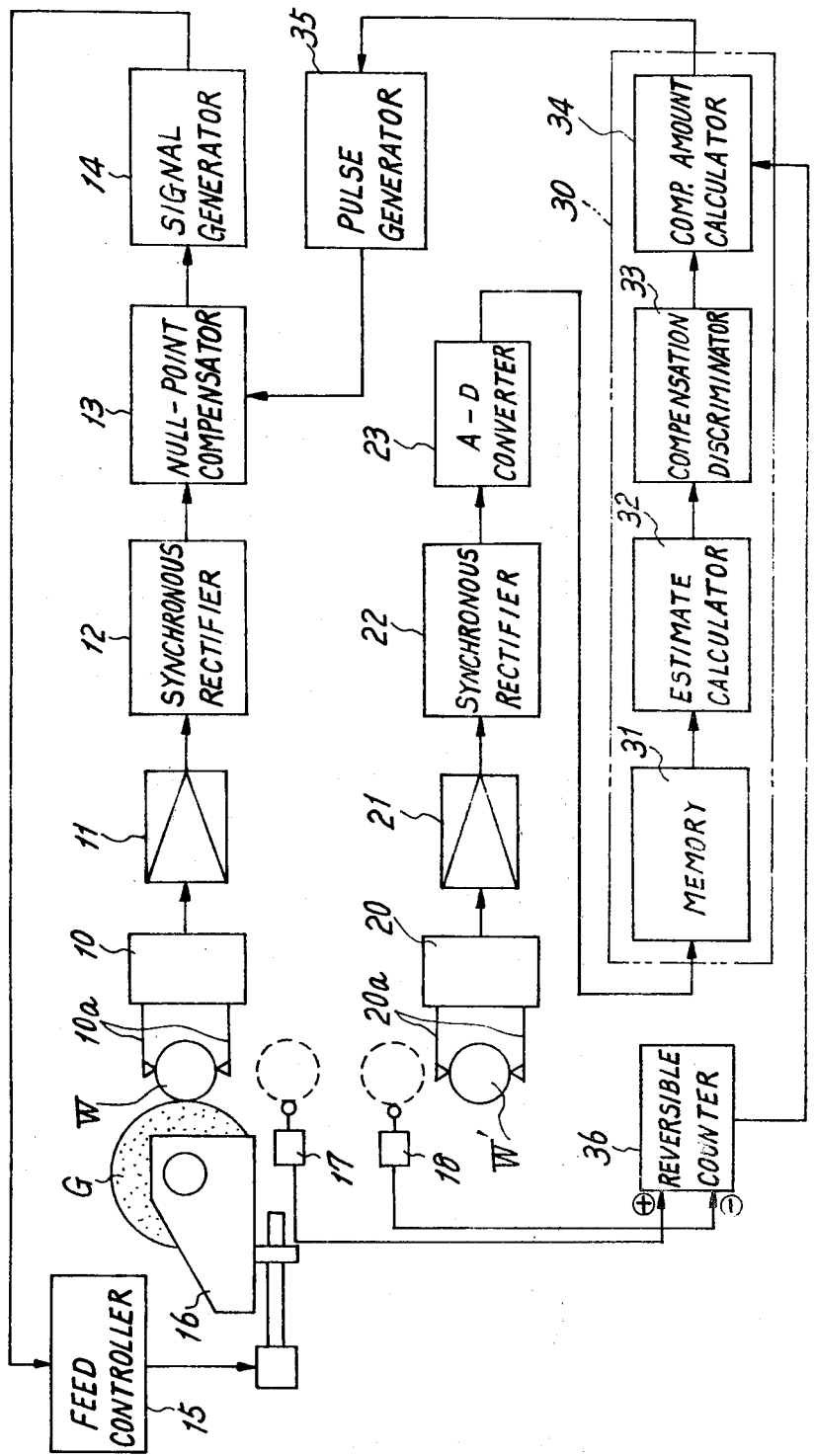
FIG. 1 is a block diagram showing a size control apparatus for a machine tool according to the present invention.

Referring now to the drawings, and more particularly to FIG. 1 thereof, 10 denotes an in-process gauge device for measuring the size of a workpiece W which is being machined by means of a grinding wheel G and 20 denotes a post-process gauge device for measuring the size of a workpiece W' which has already been machined. Both gauge devices 10, 20 are respectively equipped with pairs of feelers 10a, 20a, each pair of which contacts the workpiece at two points opposed diametrically, and with differential transformers which detect the displacement of the feelers 10a, 20a. A reference character 11 denotes an amplifier means which amplifies an output from the differential transformer of the gauge 10, a numeral 12 denotes a synchronous rectifier circuit which rectifies an amplified signal from the amplifier 11 in order to change the signal into a direct current signal with plus (+) or minus (−) polarity in accordance with the direction of the displacement of the feeler 10a, and a numeral 13 denotes a null-point compensating circuit whose construction is illustrated by way of example in FIG. 2.

Figure 2:
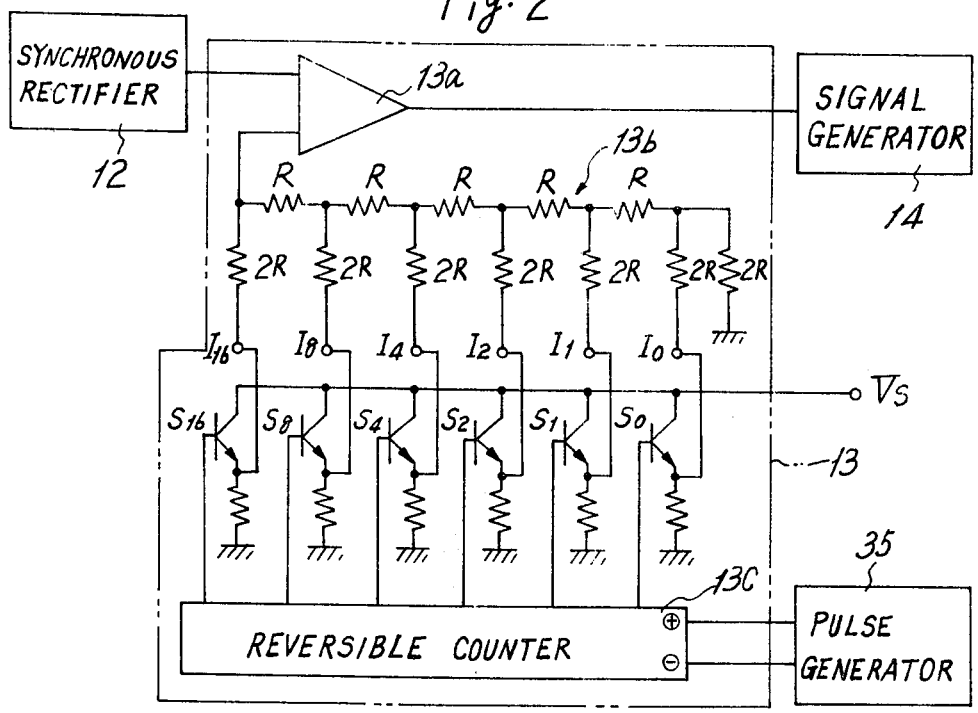
FIG. 2 shows the detail of a null-point compensating circuit illustrated in FIG. 1.

In FIG. 2, a reference character 13a denotes an operational amplifier, one input terminal of which is connected with the synchronous rectifier circuit 12, so as to receive the output of the circuit 12, another input terminal of which is connected with a ladder type digital to analog (D-A) converter 13b. A plurality of digital input terminals I0, I1, ... I16 of the D-A converter 13b are respectively connected with digital switches or switching transistors S0, S1, ... S16, the base input terminals of which are respectively connected with output terminals of a reversible counter 13c, the output terminals corresponding to respective bit positions. The digital input terminals I0, I1, ... I16 are charged with a basic voltage Vs, or are grounded when the associated switching transistors S0, S1, ... S16 are selectively caused to be conductive or non-conductive depending upon the outputs of the reversible counter 13c. The digital signals given to the input terminals are converted by the D-A converter 13b into an analog signal which is transmitted to the operational amplifier 13a. Consequently, the input signal from the synchronous rectifier 12 is subtracted by the analog signal at the operational amplifier 13a and thus, it is possible to shift the level of the measurement signal depending upon the content of the reversible counter 13c. The output signal of the null-point compensating device 13 is supplied to a signal generating circuit 14 and is compared with a preset voltage therein and as a result, a control signal for controlling the feed movement of a wheel head 16 is generated. Therefore, the null-point of the gauge device 10 is substantially shifted in response to the voltage level from the D-A converter 13b.

Turning back to FIG. 1, numeral 21 denotes an amplifier for amplifying the output signal from the differential transformer of the post-process gauge device 20, numeral 22 denotes a synchronous rectifier circuit and numeral 23 and analog to digital (A-D) converter which serves to convert a measurement value of the post-process gauge device 20 into a digital value corresponding thereto, the measurement value being a direct current voltage signal which has been rectified by the circuit 22. A numeral 30 denotes a calculating device which processes the measurement signals from the A-D converter 23 and which thereafter, transmits a compensating signal to the circuit 13 to compensate the null-point.

The calculating device 30 comprises a memory circuit 31, an estimated value calculating circuit 32, a null-point compensation discriminating circuit 33 and a null-point compensation amount calculating circuit 34. The memory circuit 31 is successively given the measurement signals converted into digital values and is capable of memorizing a predetermined number of the measurement signals which include the newest signal and the following successive signals. The estimated value calculating circuit 32 calculates a trend in a machining order from a predetermined number of the measurement values memorized within the circuit 31 and thereafter obtains an estimated value of the trend in the future. The discriminating circuit 33 discriminates whether the estimated value deviates from the upper and lower control limits or not and determines the necessity of null-point compensation. The calculating circuit 34 calculates a compensating amount based upon the estimated value and the control limits when an instruction depending upon the decision of the circuit 33 is given thereto. Considering the functions and the aims of the circuits 31 to 34 from the above description, the same functions may be achieved by means of a so-called mini-computer. Furthermore, the calculated compensating amount is supplied to a pulse generating circuit 35 which, in consequence, generates compensating pulses to be fed into the reversible counter 13c.

Figure 3:
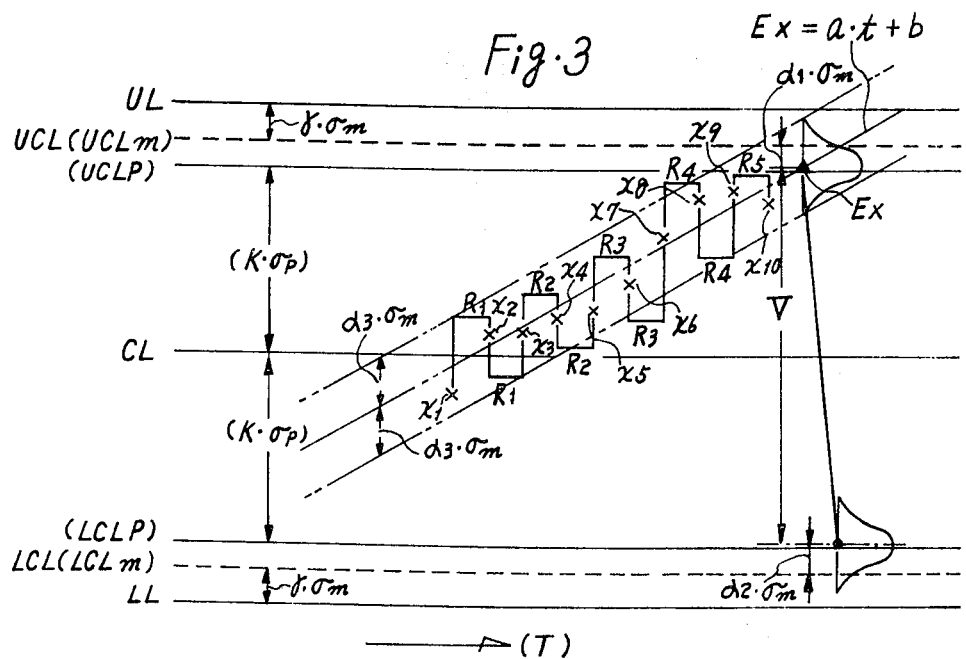
FIG. 3 shows a trend condition and dispersion in values measured by means of a post-process gauge.

With regard to the operation of the apparatus according to the present invention, the memory circuit 31 memorizes the measurement signals or data delivered from the A-D converter 23. In this embodiment, 10 data points are assumed for the sake of explanation, as shown in FIG. 3. The estimated value calculating circuit 32 does not start its operation unless data is completed for 10 points. After 10 points of data are collected within the memory circuit 31, the circuit 32 starts to calculate the estimated value if the 11th workpiece. Generally, on the condition that a proper amount of data is collected, the data may be expressed as an equation $Ex = a \cdot t + b$ since there is a linear relationship among the individual measured values. The gradient (a) of the equation may be obtained by using the following equation:

$$a = \frac{Ctx}{\sigma t^2} \qquad (1)$$

where $Ctx = \frac{1}{N} \sum_{t=1}^{N} t \cdot Xt - (mt)(mx)$ $\sigma t^2 = \frac{1}{N} \sum_{t=1}^{N} t^2 - (mt)^2$ $mt = \frac{1}{N} \sum_{t=1}^{N} t$ $mx = \frac{1}{N} \sum_{t=1}^{N} xt$ t: the number of data; $t = 1, 2, 3, \ldots N$ An equation for obtaining the intercept (b) of the above-equation may be expressed as follows;

$$b = mx - mt \cdot a \qquad (2)$$

Accordingly, the estimated value Ex is found by substituting the gradient (a) and intercept (b) which have been derived from Eq. (1) and (2) into the equation $Ex=a.t+b$ and by designating the parameter t specifying the number of workpieces to be machined the next time. Upon receiving the estimated value Ex from the circuit 32, the discriminating circuit 33 discriminates whether the value Ex deviates from the upper and the lower control limits UCL, LCL or not and thereafter generates a compensating instruction when the estimated value Ex deviates from the limits. The calculating circuit 34 calculates the compensating amount V which is based upon the value Ex and the control limits UCL and LCL when the instruction is given.

For example, in the calculating circuit 32, the gradient (a) and the intercept (b) are found by carrying out the calculations of the equations (1) and (2) based upon the measured values X1, X2, ... X10 of the 10 data points as shown in FIG. 3. After that, when the gradient (a) and the intercept (b) are substituted into the equation $Ex=a.t+b$ of the trend line and $t=11$ is designated in the equation, the 11th point value or the estimated value Ex found as an extension can be obtained. Subsequently, a judgement is performed in the discriminating circuit 33 as to whether the estimated value exceeds the upper control limit UCL or not. In this case, if dispersion in the measured values X1, X2, . . , X10 of the 10 data points is presumed to be $\sigma m$ and when a value as a result of the addition of a tolerance dispersion $\alpha_1.\sigma m$ and an estimated value Ex is compared with the value of the limit UCL, it is possible to detect an optimum for the null-point compensation in consideration of the dispersion. However, it is possible to simply compare the estimated value Ex found by the calculation with the limit UCL.

In addition, the compensating amount V is obtained based upon the estimated value Ex and the control limits in the calculating circuit 34. In the calculation of the amount V, the amount V is adopted as a difference (Ex-LCL) between the estimated value Ex and the lower control limit LCL if the dispersion $\sigma m$ is neglected. But if it is neglected, some measured values which exceed the limit LCL occur and become the cause of size accuracy hunting. Therefore, since it is not possible to neglect the dispersion $\sigma m$ as a matter of fact, the amount V is calculated by using the following equation in which the dispersion $\sigma m$ is multipled with a safety coefficient $\sigma 2$.

$$V = | Ex-(LCL+\alpha 2.\sigma m) |$$

3

Furthermore, when a measured value becomes lower than the lower control limit LCL right after the null-point compensation has been carried out, the amount V is obtained by using the following equation.

$$V = |Ex = CL|$$

4

Upon receiving the compensating amount V, the pulse generating circuit 35 generates the compensating pulses corresponding to the amount V in number and the compensating pulses are supplied to one of the input terminals (+), (−) of the reversible counter 13c as shown in FIG. 2. Thus, the digital switches S0, S1, ..., S16 are switched in response to the content of the counter 13c and the voltage signal converted by the D-A converter 13B is supplied to the operational amplifier 13A so that an output signal level of the in-process gauge device 10 may be shifted. In consequence, the wheel head 16 continues its advance movement until the output signal of the operational amplifier 13a coincides with the preset value in the signal generating circuit 14 as regards to voltage level. Thereafter, the circuit 14 transmits a retract signal to the feed control device 15 upon coincidence therebetween so that wheel head 16 may start the retract movement. Accordingly, it should be noticed that although a distance between the grinding point of the wheel G in the advanced position and a center of the workpiece is always constant, the output signal of the in-process gauge 10 is different at the time when the circuit 14 generates the retract signal. In this manner, the null-point compensation for the in-process gauge device 10 can be achieved. Furthermore, when such a compensation has been completed, all of the 10 data points which have been memorized within the memory circuit 31 heretofore are cancelled.

In addition, if a trend line in the data points indicates a lower directed trend in opposition to that shown in FIG. 3, it will be apparent that the generating circuit 35 operates to generate the compensating pulses into another input terminal (−) of the reversible counter 13c.

Another embodiment is explained hereinafter in which there are several buffer workpieces between machining and measuring stations. As stated above, all of the workpieces are measured by the post-process gauge device 20 in the measuring station and an estimated value is ascertained by the calculating circuit 32 as a result of calculating a trend based upon measurement values which have been memorized within the memory circuit 31. If the estimated value is found to be larger than the upper control limit UCL in the discriminating circuit 33, a null-point compensating amount is thereafter calculated by using the above-equation (3) in the calculating circuit 34 and the compensating pulses corresponding to the compensating amount are generated from the pulse generating circuit 35 to the reversible counter 13c so that a null-point compensation may be effected. The number of the buffer workpieces is detected and, in this case, the above-equation (3) is not further utilized for the calculation of a compensating amount. However, after the above-compensation or an initial compensation, the function of the calculating circuit 34 is modified so as to calculate a difference between two estimated values, one of which is with respect to the first buffer workpiece, another of which has been previously found with respect to the workpiece immediately preceding the first buffer workpiece.

Therefore, as shown in FIG. 4, if three buffer workpieces exist when an estimated value Ex0 has exceeded the upper control limit UCL, a difference Ex1-Ex0 between an estimated value Ex1 based on the first buffer workpiece and the above value Ex0 becomes a compensating amount derived from the first buffer workpiece. A compensating amount in the second buffer workpiece, where an estimated value thereof is treated as Ex2, becomes a difference Ex2-Ex1 between an estimated value Ex2 and the estimated value Ex1. With respect to the third buffer workpiece, where an estimated value thereof is treated as Ex3, a difference Ex3-Ex2 is determined as a compensating amount.

In such a manner, the calculations of the compensating amounts and the null-point compensating operations are completed with respect to the three buffer workpieces. Thereafter, the calculating circuit 34 is restored to its original state so as to enable the calculations for the compensating amount depending upon the equations (3) and (4). In short, measured by the post-process gauge device 20 after the third buffer workpiece is a workpiece which has been machined on the condition that the size thereof has been controlled by the in-process gauge device 10, the null-point of which had been compensated with the initial compensating amount V. As to the workpieces after the third buffer workpiece, it is unnecessary to compensate the null-point based upon the difference between the estimated values and those workpieces are available for calculating a trend.

With respect to detecting the buffer workpieces, as shown in FIG. 1, limit switches 17, 18 are provided for respectively detecting a workpiece which has just been machined and a workpiece which is to be transferred to the measuring station and connected with a reversible counter 36. In this case, the switches 17, 18 operate to cause the counter 36 to step up and to step down respectively. Therefore, it will be able to correctly detect the number of the buffer workpieces and also the change in number thereof. Depending upon a detected number of the buffer workpieces, the calculating circuit 34 is controlled in times of calculating the difference between the estimated values. In this conjunction, since the compensation is carried out for each buffer workpiece after the initial null-point compensation has been completed, it may also be able to effect the compensation based upon the variation in the actual measurement value of each buffer workpiece. Moreover, an advantage exists in that excessive compensations are prevented.

With reference to FIG. 5, there is shown a block diagram illustrating a significant part of still another embodiment according to the invention wherein the reference numeral 50 denotes a mini-computer performing central data processing functions in relation to other constituent system components. From the description hereinafter, it will be recognized that the computer 50 in this embodiment is available for accomplishing the foregoing functions of the means 31 to 34 shown in FIG. 1.

Figure 6:
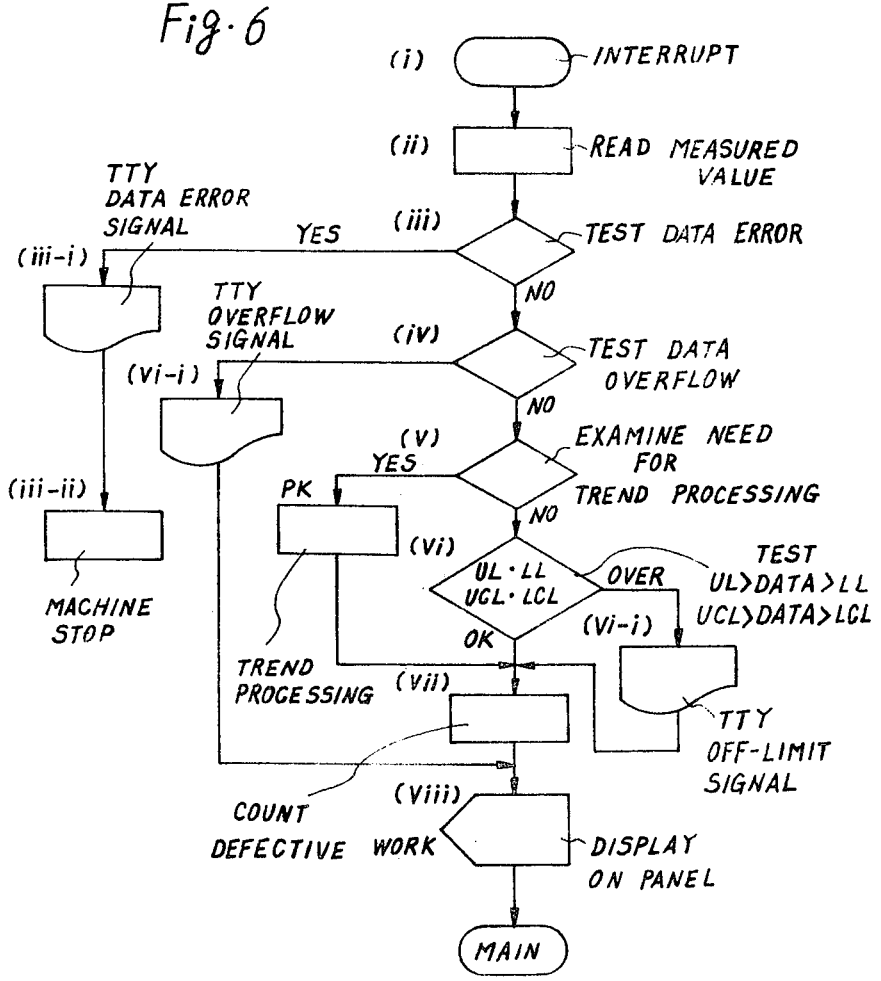

The numerals 51 through 54 represent a magnetic disk, a teletypewriter, a paper tape reader and a line printer, respectively, operated as peripheral devices for the computer 50 through interfaces 55 to 58. The measured value from the post-process gauge device 20 is supplied to the computer 50 by way of the above-stated A-D converter 23 and an interface 59. A numeral 60 denotes a display panel connected to the computer 50 through an interface 61 for displaying abnormal states of the measuring devices 10 and 20. A numeral 63 denotes an interface which connects the above-stated reversible counter 36 with the computer 50 for applying data concerning the number of buffer workpieces. Furthermore, connected to the computer 50 through an interface 62 is the above-stated pulse generating circuit 35 to which a compensating amount or data is supplied from the computer 50. Accordingly, by taking into consideration these facts, it is noticed that the A-D converter 23 and the pulse generating circuit 35 are respectively associated with the in-process and post-process gauge devices 10, 20 in a manner similar to that of FIG. 1. FIGS. 6 and 7 show flow charts of measurement processing routines by which the computer 50 processes the measurement values from the post-process gauge device 20 and ascertains the compensating value. When an interrupt(i) of this routine occurs, the value measured by the gauge device 20 is read in the step (ii) to be stored in the memory of the computer 50. In a step (iii), the measured value is examined for errors due to the machine tool and the gauge device 20. If an error is detected, a data error signal is delivered from the teletypewriter 52 in the step (iii-i). Thereafter, the processing is directed to a step (iii-ii) to urgently stop the operations of the machine tool.

When no error is detected, it is determined in step (iv) whether or not the read value overflows the A-D converter region. In the event of an overflow, an output is delivered from the teletypewriter 52 and the routine goes to step (viii). When there is no data over-flow, the routine advances to a step (v) in which the need for trend processing is examined. The examination is on the basis of an arbitrary number of the measured values which are assumed as 10 point data for the sake of explanation. In this conjunction, stored within the memory are 10 data points, more than which is eliminated therefrom in an order of earlier storing. If necessary, trend processing is executed according to the trend processing program PK shown in FIG. 7. If this is not required, or there are not 20 data points within the memory, a step (vi) examines whether the measured data is within the upper and lower control limits UCL and LCL.

If the measured data is not within the limits, an off-limit signal is delivered from the teletypewriter 52 and the workpiece is indicated as defective in step (vi-i). In step (vii) which follows the steps (vi), (vi-i) and the program PK, the number of defective workpieces are counted and the result and the completion of this routine are displayed on the display panel 60 in the following step (viii). Thereafter, this routine is halted.

In summarizing the foregoing facts, the computer 50 executes the measurement processing routine in FIG. 6 each time the post-process gauge device 20 generates the measured data and the interruption is generated. Accordingly, upon the completion of the 10 data points, the computer 50 executes the trend processing program PK, more details of which will now be described with reference to FIG. 7.

When the trend processing is required in step (v) as in FIG. 6, the program execution starts in step (i) of FIG. 7. First, the routine is initialized for preparing the start of the trend processing in step (ii). Then, in step (iii), a determination is made whether the data read in step (iii) of FIG. 6 is within the tolerances UL and LL which are constant values supplied to the computer 50 by the aid of the teletypewriter or data input means 52. If the data is not within the range of UL and LL, an off-tolerance signal is generated by the teletypewriter 52 in step (iii-i) whereby the data used in the trend processing are cleared and the routine is directed to a step ($x$).

When the data is within the range of UL and LL, the routine goes to step (iv) wherein a decision "Yes" is made only after the null-point compensation is executed in step (viii-i) described hereinafter. For that reason, performed at the next time is a step (v) in which it is determined whether the measured value is with the range of control limits UCL and LCL. If it is not within the range, the following step (v-i) examines whether the measured value has not been within the range a predetermined number of times, for example 2 times in succession. If less than 2 time or if within the range in step (v), the processing moves to step (vi) in order to determine whether the gradient (a) is equal to zero.

When a=0, the processing moves to step (ix) to effect a display on the display panel 60. It is to be noted that the gradient (a) is set to be 0 as long as the 10 point data are not collected. If $a \neq 0$, the estimated value Ex is calculated in step (vii) wherein the foregoing equation Ex=a.t+b is adopted and the gradient a and the intercept b which are obtained in step (xi) explained hereinafter are substituted therein. The estimated value Ex is obtained by designating the workpiece number within the equation in addition to the substitution of the values a, b. The following step (viii) is carried out to examine whether or not the estimated value Ex is within the range of control limits UCL and LCL. If the value Ex is within the range, the processing proceeds to step (ix) to display the normality of measured values.

If not, and if more than 2 times in the step (v-i), the processing moves to step (viii-i) to instruct the null-point compensation and to calculate the amount V of the compensation. More specifically, (I) the compensation instruction is delivered in the following events.

1 Ex + $\alpha$1.$\sigma$m $\geq$ UCL, Ex − $\alpha$1.$\sigma$m $\leq$ LCL

2 When the measured values are beyond UCL or LCL at n points in succession. Where the symbols $\alpha l$ and n denote paramerters given by the operator according to process step. (II) The deviation$\sigma$m is determined in general by the following equation.

$$\sigma m = \frac{\bar{R}_s}{d_2} \quad (3)$$

where $$\bar{R} = \frac{1}{l} \sum_{j=1}^{l} R_j$$

number of groups of measured values: j=1,2,3,...,l, number of measured values in a group: S=1,2,3,...,k, $d_2^s$: coefficient depending on the number of measured values in group S: for example, where s=2, then $d_2^s$=1.128 Rj is the differential between the maximum and minimum measured values in the group. (III) The upper control limit UCL and the lower control limit LCL can be determined depending upon either mechanical deviation$\sigma$m or processing deviation$\sigma$p (FIG. 3).

a. Where the limits UCL and LCL are determined on the basis of $\sigma$m:

UCLm=UL−$\gamma$.$\sigma$m

LCLm=LL+$\gamma$.$\sigma$m b. Where the limits are determined on the basis of $\sigma$p:

UCLp=CL+k.$\sigma$p

LCLp=CL−k.$\sigma$p wherein

CL : (UL + LL)/2

P : (UL − LL)/6.Cp

Cp : processing capability coefficient (For example, Cp=1.33)

$\gamma$, k: parameters predetermined according to the process step. The values UCL and LCL are determined in relation to UCLp versus UCLm, and LCLp versus LCLm, in the following manner.

UCLp is taken as UCL when UCLp $\geq$ UCLm

UCLm is taken as UCL when UCLm $\geq$ UCLp

LCLp is taken as LCL when LCLp $\leq$ LCLm

LCLm is taken as LCL when LCLm $\leq$ LCLp

If UCL and LCL are larger than UL and LL respectively, then UL is taken as UCL, and LL as LCL.

This relationship for UCL and LCL is confined throughout the processing routines shown in FIGS. 6, 7. In addition, the calculation of the deviation $\sigma$m in item (II) and the determinations of the limits UCL, LCL in item (III) are respectively performed in steps (xi) and (xii) which are further explained hereinafter. Therefore, it should be noticed that in step (viii-i), the compensation instruction is obtained by substituting the deviation $\sigma$m and limit UCL or LCL which have been already found within the equation of event (1) of item (I).

Yet in the step (viii-i), the compensating value V is determined after the obtaining of the instruction IV The determination of the value V is as follows:

1 When Ex+$\alpha$1.$\sigma$m $\geq$ UCL: V=−|Ex−(LCL+$\alpha$2.$\sigma$m)| If a=0, then V=−|U-CL−(LCL+$\alpha$2.$\sigma$m)|

2. When the measured values exceed LCL: V=|CL−Ex| If a=0, then V=|CL−LCL|

The above conditions are based on the assumption that the direction from LL to UL is positive and the direction from UL to LL is negative. The symbol $\alpha$2 is a parameter given by the operator. After completion of the amount V, the computer 50 transfers the amount V into the generating circuit 35 (FIG. 5) by way of the interface 62. As a result, the compensating circuit 13 modifies the input from the synchronous rectifier circuit 12 by the input from the pulse generating circuit 35 whereby the null-point of the gauge device 10 is substantially shifted so as to adjust the advanced position of the wheel head 16.

In the next step (viii-ii), the compensating instruction and the amount V thereof are indicated on the display panel 60. Thereafter, in step (x), an examination is carried out whether the 10 point data have been collected or not, and, if not collected, the routine goes to step (x-i) and further, to step (x-ii) so as to take the gradient a as 0 and to leave the deviation $\sigma$m as it is. If collected in the step (x), the gradient a, the intercept b and the deviation $\sigma$m are respectively calculated by using the above equations (1), (2) and the equation in the item (II). In the following step (xii), the control limits UCL and LCL are set according to the computed value of the deviation $\sigma$m. For this setting, the processing capability coefficient Cp is taken into consideration as described in item (III) above. After steps (xii) and (x-ii), the processing moves to the step (vii) of FIG. 6.

Therefore, in a processing routine when the interrupt is again effected after the compensation instruction has been supplied in step (viii-i) of FIG. 7, the routine advanced to the step (iv) of FIG. 7 moves therefrom toward step (iv-i). Here, the null-point compensation test is performed to ascertain if the compensation has been correctly carried out. In the case of FIG. 3, where the size of the workpiece increases in accordance with the progress of the machining, the compensation is determined not to have been correctly carried out if the measured value of the workpiece machined immediately after the compensation is larger than ($Xb-\sigma 3.\sigma m$) and is determined to have been correct if the measured value is smaller than ($Xb-\alpha 3.\sigma m$).

In the case where the size of the workpiece decreases in accordance with the progress of the machining, the compensation is determined to have been correctly carried out when the measured value is larger than ($Xb+\alpha 3.\sigma m$). The symbol $Xb$ indicates the value on the regression line corresponding to the workpiece immediately before the compensation is performed. The parameter $\alpha 3$ for the range of $\pm\alpha 3.\sigma m$ is selected so that this range is larger than the range of normal distribution of the deviation of actually measured values and so that an actually measured value exceeds this range only when an artificial factor and/or an abnormal factor is present in the processing.

Still in step (iv-i), if the compensation is found to have been correctly carried out, the 10 point data within the memory are initialized in step (iv-ii). Thereafter, the compensation instruction and the amount V thereof are cleared in step (iv-iii). Furthermore, results of these processings are delivered from the teletypewriter 52 in step (iv-iv) and the routine goes to step (v) which also follows the step (iv-i).

In addition, if a buffer workpiece or workpieces are stored between the machining station and the measuring station, an initial compensating amount V is directed to the generating circuit 35 when the value $Ex+\alpha 1.\sigma m$ first exceeds the upper control limit UCL. Thereafter, a differential between presently and previously estimated values is instructed as a compensating amount for the buffer workpiece in step (viii-i). Accordingly, it should be noted that the differential value is applied for the null-point compensation each time the buffer workpiece is measured by the post process gauge device 20.

While the principles of the invention have been described above in connection with specific embodiments and particular modifications thereof, it is to be clearly understood that this description is made only by way of example and not as a limitation on the scope of the invention.

What is claimed as new and desired to be secured by letters patent of the United States is:

1. A size control apparatus for a machine tool comprising:
    a first measuring means provided at a machining station for measuring a workpiece under the machining operation of said machine tool and for controlling the operation of said machine tool in accordance with a size of the workpiece,
    a second measuring means provided at a measuring station separate from said machining station for measuring a workpiece already machined,
    a calculating device responsive to said second measuring device for calculating an estimated value to be obtained for an unprocessed workpiece depending upon information obtained from machined workpieces and for producing an instruction signal as the result of comparing said estimated value with a first predetermined control limit, and
    a compensating device capable of modifying the control operation of said first measuring means in response to said instruction signal.

2. A size control apparatus as set forth in claim 1 wherein said calculating device includes data storage means capable of memorizing a predetermined number of data concerning workpiece size measured by said second measuring means and capable of eliminating data in excess of the predetermined number so as to calculate said estimated value depending upon the most recent data.

3. A size control apparatus as set forth in claim 1 wherein said calculating device is operable to determine execution of the compensation when a value which is determined by said estimated value and a first predetermined value exceeds said first control limit, to obtain a compensating amount by subtracting a second predetermined value from a difference between the estimated value and a second control limit, and; to output said compensating device so that hunting in said size control apparatus may be prevented.

4. A size control apparatus as set forth in claim 3 wherein said compensating device includes:
    a modifying means for modifying an input from said first measuring means by said compensating amount from said calculating device and transferring a modified output, and
    a signal generating means for generating an operating signal for changing the operation of said machine tool when said modified output coincides with a predetermined value preset therein.

5. A size control apparatus as set forth in claim 1 which comprises a detecting device for counting the number of the machined workpieces which are between said machining and measuring stations and for supplying said detected number to said calculating device, said calculating device being operable to supply an initial compensating amount to said compensating device when said estimated value first exceeds said first control limit and, thereafter, to supply a differential between presently and previously estimated values as said instruction signal to said compensating device until said compensating value is reflected in said measured value.

6. A size control apparatus for a machine tool comprising:
    a first measuring means for measuring a workpiece under the machining operation and for controlling the operation of said machine tool in accordance with the size of the workpiece,
    a second measuring means for measuring an already machined workpiece,
    a memory device for successively memorizing the measured values from said second measuring means in an order of measuring operation,
    a processing device operable to obtain a tread from a predetermined number of said measuredvalues memorized within said memory device and to ascertain an estimated value for the workpiece to be next machined depending upon said trend,
    a judgment device for generating a compensating instruction as the result of comparing said estimated value with a first control limit,
    a calculating device for calculating a compensating amount corresponding to said estimated value in response to said instruction, and a compensating device capable of modifying the control operation of said first measuring means in response to said compensating amount.

7. A size control apparatus as set forth in claim 6 wherein said processing device serves to ascertain said estimated value from a trend which is extended from the past to the present and to the future based upon said predetermined number of measured values.

8. A size control apparatus as set forth in claim 7 wherein said judgement device generates said compensating instruction when a value determined by said estimated value and a first predetermined value exceeds said first control limit, said first predetermined value being defined in relation to the standard deviation of said measured values.

9. A size control apparatus as set forth in claim 8 wherein said calculating device is operable to obtain said compensating amount by subtracting a second predetermined value from a difference between said estimated value and a second control limit when said compensating instruction is generated.

10. A size control apparatus as set forth in claim 9 wherein said machine tool is a grinding machine comprising:
- a wheel head provided with a grinding wheel for machining a cylindrical workpiece,
- a feed mechanism for moving said wheel head toward and away from said workpiece, and
- a feed control device for controlling said feed mechanism and for determining the advance position of said wheel head in response to said compensating device.

11. A size control apparatus as set forth in claim 6 which further comprises:
- a detecting device for counting the number of buffer workpieces which exist between said first and second measuring means and for applying the number of said calculating device,
- said calculating device being capable of transmitting a differential between presently and previously estimated values as a compensating amount derived from each buffer workpiece to said compensating device until an initial compensation depending upon said compensating amount is recognized by said second measuring means.

12. A size control apparatus as set forth in claim 11 wherein said detecting device comprises:
- a first detector for detecting the machined workpiece exiting from a machining station,
- a second detector for detecting the machined workpiece which will enter a measuring station, and
- a reversible counter operable to count up and down in response to said first and second detectors and to transmit its content to said calculating device.

13. A size control apparatus for a machine tool comprising:
- a first measuring means for measuring a workpiece under the machining operation and for controlling the operation of said machine tool in accordance with the size of the workpiece,
- a second measuring means for measuring the machined workpiece at a measuring station,
- a digital computer
  1. to memorize a predetermined number of the measured values successively supplied from said second measuring means,
  2. to calculate a trend in said predetermined number of measured values,
  3. to derive an estimated value from said trend,
  4. to determine the necessity of compensation as a result of comparing said estimated value with a first control limit, and
  5. to calculate a compensating amount based upon said estimated value and a second control limit when said compensation is necessary, and
- a compensating device capable of modifying the control operation of said first measuring means in response to said compensating amount.

14. A size control apparatus as set forth in claim 13 wherein said digital computer instructs said compensation when said measured values obtained from the machined workpieces are beyond one of said control limits more than a predetermined number of times in succession.

15. A size control apparatus as set forth in claim 13 wherein said digital computer is adapted to calculate the deviation of said measured value and to determine said control limits according to said deviation.

16. A size control apparatus as set forth in claim 15 wherein said digital computer starts the calculation of said compensating amount when a value determined by said estimated value and said deviation exceeds said first control limit.

17. A size control apparatus as set forth in claim 16 wherein said digital computer obtains said compensating amount by subtracting a second predetermined value from a differential between said estimated value and said second control limit in calculating said compensating amount.

18. A size control apparatus as set forth in claim 13 which further comprises:
- a detecting device for counting the number of buffer workpieces which exist between a machining station and said measuring station and for applying the number information to said digital computer to cause said computer to execute a specified processing for said compensating amount.

19. A size control apparatus as set forth in claim 18 wherein said specified processing is executed so that a differential between presently and previously estimated values is determined as a compensating value derived from said buffer workpieces and said differential is supplied to said compensating device each time each buffer workpiece is measured.

* * * * *